Nov. 22, 1932.  W. VAN B. ROBERTS  1,888,360
MEANS FOR HEATING CATHODES OF SPACE DISCHARGE DEVICES
Filed March 18, 1930

INVENTOR
WALTER VAN B. ROBERTS
BY
ATTORNEY

Patented Nov. 22, 1932

1,888,360

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

MEANS FOR HEATING CATHODES OF SPACE DISCHARGE DEVICES

Application filed March 18, 1930. Serial No. 436,688.

This application is a continuation in part of my co-pending application Serial No. 326,989 for means for heating cathodes of space discharge devices filed December 19th 1928.

This invention relates broadly to rectifying and filtering systems and to methods of heating the electron emitting electrodes of space discharge devices. More particularly, this invention relates to methods of and means for employing multiphase alternating current for energizing the electrodes of space discharge devices.

Various methods have been proposed for heating the electron emitting electrodes or cathodes of space discharge devices by single phase alternating current, but most of these methods produce an objectionable hum or pulsation in the apparatus in which the space discharge devices are used. It is the object of this invention to decrease or entirely eliminate this objectionable hum or pulsation by providing means for heating the cathodes by multiphase alternating current when it is available or can be obtained from a single phase alternating current.

The object of the present invention is attained by providing a whole wave rectifier for each phase of the multiphase current and by combining the outputs from the rectifiers either by connecting them in parallel or in series. The combined outputs may be used without filtering as a source of direct current for heating the cathode of the standard type of space discharge device.

While the output currents are usually not filtered, it may be desirable under some circumstances to provide a separate filter circuit for the output of each rectifier. In some particular instances it may even be desirable to add a third filter system after the outputs have been combined.

For a more complete understanding of my invention, reference is made to the following specification and claims which should be read in connection with the accompanying drawing, in which:

Figure 1:
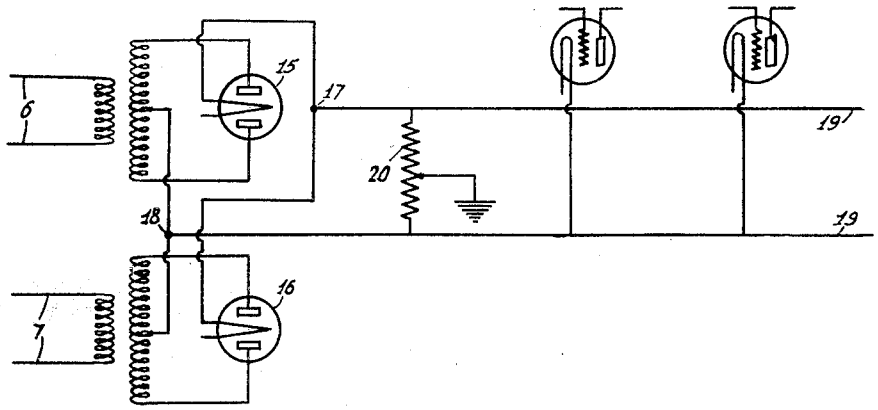
Fig. 1 illustrates diagrammatically a system in which a whole wave rectifier is associated with each phase of a multiphase current, and in which the outputs of the rectifiers are combined without filtering.

Referring more particularly to the drawing in Fig. 1, the leads 6 and 7 are adapted to be supplied with alternating currents which are approximately of equal value and ninety degrees out of phase. The two phase alternating current may be obtained from any suitable source which is available, or it may be obtained by splitting a single phase current in the manner illustrated in my co-pending application Serial No. 326,989.

Whole wave rectifiers 15 and 16 are operatively associated with leads 6 and 7 respectively by means of the usual coupling transformers. The rectifiers convert the alternating current from each source into pulsating direct current in the usual manner.

In this modification, filter circuits are not employed and the positive side of the output of each rectifier is connected to a common point 17 and the negative side of the output of each rectifier is connected to a common point 18. Conductors 19 supply current from these common points 17 and 18 to the cathodes of any desired number of space discharge devices. It is, of course, also possible to use the energy in the output for providing plate potential and grid biasing potential for radio apparatus. When the arrangement is used to supply filament heating current for radio apparatus, a resistance member 20 is preferably shunted across the conductors 19 and the midpoint of the resistance member is grounded to form a common return point for the grid and plate circuits of the devices.

If the rectifiers 15 and 16 are operated at such a load that they behave as "square law" devices, the sum of their outputs will be constant being proportional to $\sin^2$ plus $\cos^2$. The current produced by this system is sufficiently near pure direct current to be satisfactory for heating the cathodes of space discharge devices, especially if the cathodes are operated at a low voltage. Even if rectifiers 15 and 16 do not operate as "square law" rectifiers the push pull connection of each rectifier eliminates the odd harmonics of the frequency of the alternating current and the two phase connection with the currents ninety degrees out of phase eliminates the even harmonics.

Figure 2:
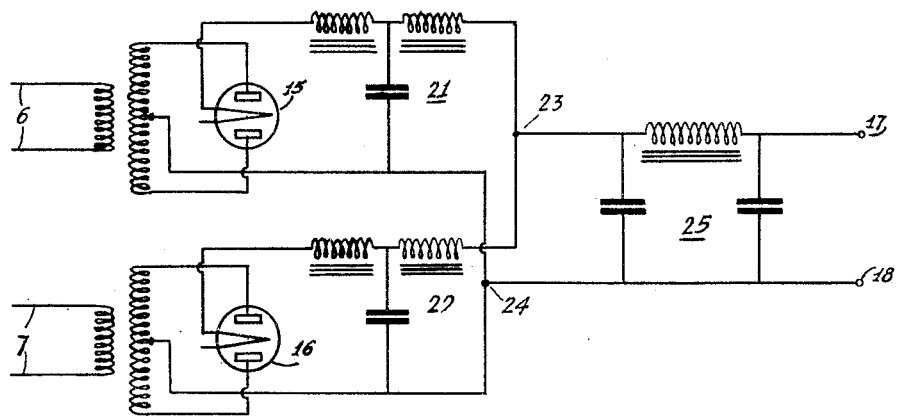
Fig. 2 illustrates a modification in which a separate filter system is provided for the output of each of the rectifiers, and an additional filter system is provided for the combined outputs.

Fig. 2 illustrates a similar arrangement except that the filter circuits have been added thereto. The output of rectifier 15 is provided with a filter system indicated generally at 21, and the output of rectifier 16 is provided with a second filter system indicated generally at 22. The positive sides of the outputs of filters 21 and 22 are connected at a common point 23, and the negative sides of the outputs of filters 21 and 22 are connected at a common point 24. A third filter system indicated generally at 25 is provided for filtering the combined outputs. The positive side of the output of filter 25 corresponds to the common point 17 of Fig. 1, and the negative side of the output of filter 25 corresponds to the common point 18 of Fig. 1.

It is to be understood that it may not be necessary or advisable to use three filter systems as shown, but that any one of them or any combination of them may be used to obtain the desired results. For example:—filter systems 21 and 22 may be omitted and all of the filtering may be done by filter system 25. On the other hand, it may be desirable to use filter systems 21 and 22 and to omit filter system 25. Again it may be desirable to omit either one of the filter systems 21 and 22, using the other filter system separately or in combination with filter system 25.

Various other arrangements may be devised without departing from the spirit of my invention and it is to be understood that I had no desire to be limited by the particular modifications disclosed but only by the scope of the appended claims.

I claim:

1. In combination, a multiphase alternating current system, a whole wave rectifier operatively associated with each phase of said multiphase system, a filter system for the output of each rectifier, common leads for the outputs of the filter systems, and an additional filter system for filtering the combined output in said common leads.

2. In combination, a source of alternating current, a second source of alternating current which is ninety degrees out of phase with the alternating current in the first mentioned source, a whole wave rectifier operatively associated with each source, a filter system for each rectifier, means for connecting the outputs of the filter systems to a single pair of leads, and an additional filter system for smoothing out the current in said common leads.

3. In combination, a source of multiphase alternating current, a whole wave rectifier associated with each phase of said multiphase current, a pair of common leads, connections between the output of each of the rectifiers and said pair of common leads, a filter system interposed in the connections between one of said rectifiers and said pair of common leads, and an additional filter system for smoothing out the current in said pair of common leads.

4. In combination, a source of alternating current, a second source of alternating current out of phase with the alternating current in the first mentioned source, a full-wave rectifier adapted to rectify energy from one of said sources, a filter system connected to the output of said rectifier, a second rectifier connected to said other source adapted to rectify energy from said other source and a filter system for filtering the combined output of said two rectifiers.

WALTER van B. ROBERTS.